2,877,790
SELF-CLOSING VALVE FOR TAP BUSHINGS OF KEGS

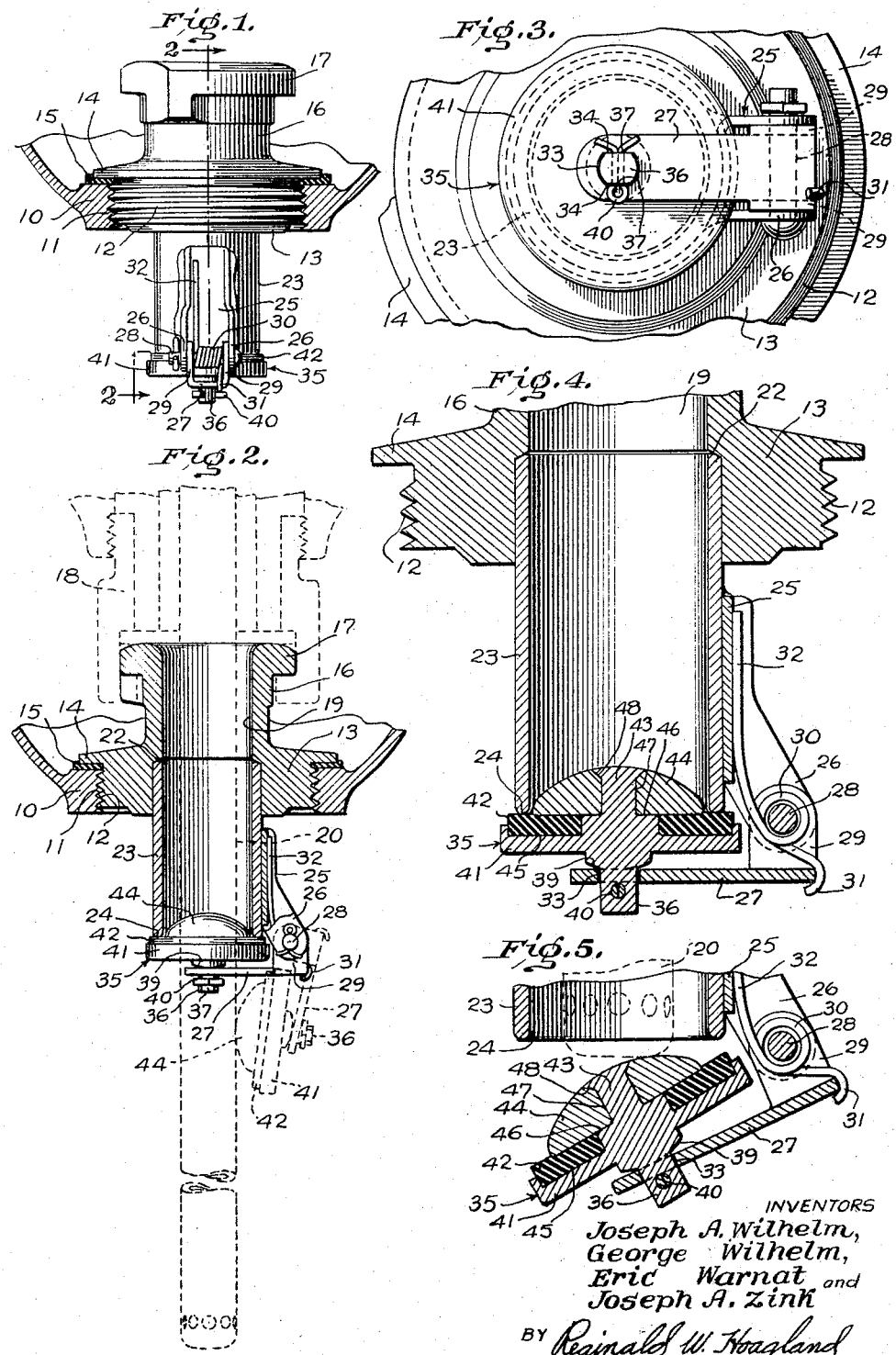

Joseph A. Wilhelm, George Wilhelm, and Eric Warnat, Lexington, and Joseph A. Zink, Croswell, Mich.

Application December 17, 1954, Serial No. 475,948

1 Claim. (Cl. 137—320)

The present invention relates to self-closing valves, and more particularly to valves used with tap bushings of beverage kegs for sealing off the interior of the kegs except during such time that said kegs are on tap for dispensing the contents therefrom.

After the keg without a self-closing valve thereon has been emptied, the interior of the keg is usually left open to the atmosphere through the bushing. Flies and other insects are often attracted by the small quantity of beverage remaining in the keg, and they crawl into the keg, thus contaminating the keg. Also, dirt and other foreign matter finds its way into kegs in which the tap bushings have been left open.

Although self-closing valves on tap bushings that are opened by insertion of the tapping tube into the keg and closed upon removal of the tapping tube from the keg have heretofore been contemplated, they, for one reason or another, have not been accepted in the trade. Cheapening the construction in an effort to keep the cost down has often prevented such devices from being effective for the purpose intended, while on the other hand, efficient devices of complicated structures have priced themselves off of the market.

It is therefore an object of the present invention to provide a valve of the above-indicated character which is simple and substantial in construction, which is adapted for attachment to tap bushings now on the market, which can be manufactured economically and which will be thoroughly efficient and practical in use.

Another object of the invention is to provide, in a device of the character set forth, a novel valve construction whereby a yieldable material efficiently effects an airtight seal for the valve when closed and a metallic dome-like member retains the yieldable material in place and protects said yieldable material from becoming damaged by the tube of the tapping unit during insertion and withdrawal of said tube into and out of the keg.

A further object of the invention is to provide, in a device of the above character, a simple and novel construction for mounting a valve unit on a pivoted spring-urged arm so that the valve unit has limited movement relative to the arm for adjusting itself to a position whereby a perfect airtight seal is assured.

It is also an object of the invention to provide, in a device of the character set forth, a novel manner of attachment of a tubular extension of the improved valve construction to existing tap bushings.

These, together with other auxiliary features and objects of the invention which will later become apparent as the following description proceeds, are attained by the present invention, a preferred embodiment of which has been illustrated, by way of example only, in the drawings, wherein:

Figure 1 is an elevation of a conventional tap bushing with the improved valve construction attached;

Figure 2 is a vertical section of same taken substantially on line 2—2 of Figure 1 and showing in dotted lines a tapping unit thereon;

Figure 3 is a bottom plan of the valve construction and bushing with portions of said bushing broken away;

Figure 4 is an enlarged sectional view similar to Figure 2 and showing the entire valve construction in section and in closed position; and Figure 5 is a sectional view similar to the lower portion of Figure 4, but showing the valve in the act of being forced open by an end of a tapping tube.

Referring now more specifically to the accompanying drawings wherein like numerals designate similar parts throughout the various views, there is indicated by the numeral 10 in Figures 1 and 2 an annular boss which is on a central depression formed in a head of a metallic keg and which has a threaded opening 11 therein communicating the interior of the keg with the atmosphere.

Screwed into the opening 11 are threads 12 on a collar-like portion 13 of a tap bushing, and upwardly of said threads there is provided on said collar a laterally extending annular flange 14 that limits inward threading of the bushing into the opening by clamping a gasket 15 between same and an outer face of the boss 10. Normally, the bushing remains a permanent part of the keg, but when desired, it may be removed. The bushing has an upstanding tubular neck portion 16 of reduced diameter formed centrally on the collar thereof which has on its upper end a notched flange 17 which forms a head that is adapted for attachment of a tapping unit 18 thereon, as shown in dotted lines in Figure 2. The cylindrical bore in the upstanding tubular portion which is designated by the numeral 19 extends entirely through the bushing and receives therein the tapping tube 20 of the tapping unit 18. Normally, the bore 19 is of the same diameter throughout its length, but in the present instance, it has been altered to accommodate securement therein of the improved valve construction.

In the present invention, the lower end portion of the bore 19 is reamed or otherwise increased to a larger diameter, as shown at 21, thus producing a shoulder 22 at its upper terminus against which abuts the upper end of a tubular member 23 that is force-fitted in the reamed enlargement 21 of the bore 19. The size of said enlargement is equal to the wall thickness of the tubular member 23, thus the inner cylindrical surface of said tubular member lies flush with the cylindrical surface of the bore 19 for free passage of the tapping tube 20 therethrough.

The tubular member 23 provides a permanent downward extension of the bushing and bore 19 therein, and its lower end forms a valve seat 24 located within the keg. On the outer cylindrical side of the tubular member 23 is welded, soldered, or otherwise secured, the bight portion of a substantially U-shaped bracket 25 which is constructed of sheet metal cut and bent to shape. Between depending ears 26 on the opposite side walls of the bracket 25 is pivotally supported one end of an arm 27 by the extending of a pin 28 through holes in said depending ears and through other holes in upstanding spaced ears 29 on said arm. A spring 30, coiled about the pin 28 and having one of its ends 31 hooked over an end of the arm 27 while its other end 32 bears against the inner surface of the bight portion of the bracket 25, yieldably urges the free end of the arm toward the valve seat 24. The arm 27 which is like the bracket 25 in that it is constructed of a sheet metal stamping blanked and pressed to shape has an opening 33 therethrough adjacent its free end which is slightly elongated and provided with opposite flat sides 34 extending longitudinally of said arm.

Projecting downwardly from a valve 35 and extending through the opening 33 is a stud 36 which also has its opposite sides flat, as at 37, for engagement with the flat sides 34 of the opening 33 to prevent rotation of said stud in said opening. Above the arm 27, the stud 36 is provided with a shoulder which has an arm-contacting surface 39 thereon that is curved on an arc to permit rocking movement of the valve relative to the arm as shown in Figure 5. A cotter pin 40 fastened beneath the arm in a cross bore in the stud holds the valve connected to the arm. The location of the cotter pin 40 and the extent of elongation of the opening 33 relative to the diameter of the stud control the limits of rocking motion of the valve on the arm.

The shouldered stud 36 is formed a part of the main body member of the valve 35 which also includes an annularly recessed disc portion 41 into which a resilient washer 42 is positioned, and a rivet pin 43 that retains a cap 44 is clamping position on said resilient washer. The annular recess 45 in the disc portion 41 is of less depth than the thickness of the resilient washer, and the cap 44 is of smaller diameter than the bore in the tubular extension 23 which permits seating of the outer portion of the upper face of the resilient washer on the valve seat 24 with the cap 44 received within the tubular extension as clearly shown in Figure 4. The rivet pin 43 is of less diameter than that of the unrecessed central portion of the disc 41, thus a shoulder 46 is provided at the base of the rivet pin 43 against which the cap 44 bears to control the compression of the portion of the resilient washer clamped by said cap. The cap which is substantially shaped like a segment of a sphere has a central opening 47 therethrough which is flared outwardly as at 48, at its upper end, and it is into this opening and its flared upper end that the rivet pin 42 extends and is riveted. After the riveting operation, the exposed end of the rivet pin is smoothed off to blend with the curvature of the dome-like sphere segment.

In operation, a keg, after being filled with a beverage, is plugged with a cork and, if required by law, sealed in the usual manner, both of which are not shown. When it is desired to tap the keg, a tapping unit is securely connected to the head of the bushing by engagement on the notched flange 17 thereof and the seal is broken and the cork forced past the valve and into the keg by downward pressure of the tapping tube 20 of the tapping unit. Contact of the tube with the resilient sealing washer 42 is prevented because of the raised dome-like shape of the cap 44 and the fact that the valve unit 35 is permitted to rock on the arm 27 during movement of the arm on the pivot pin 28. While the keg is on tap and throughout the entire dispensing of the beverage from the keg, the tapping tube remains in the keg and holds the valve open against spring pressure tending to close same, as shown in dotted lines in Figure 2.

After the keg has been emptied, the tapping unit is removed in the usual manner. During upward movement in the removal of the tapping tube from the bushing, the raised dome-like cap holds the resilient washer out of engagement with the tube, thus preventing destruction of said washer. Upon disengagement of the tube with the dome-like cap, the spring 30 forces the valve to closed position. By having the valve 35 freely rockable for limited movement relative to the spring-urged arm 27, it will be seen that the valve will adjust itself to provide a highly efficient airtight seal completely around the valve seat 24 upon removal of the tapping tube from the keg. Thus, insects, dirt, or any other foreign matter are prevented from entering the empty keg.

In view of the foregoing description taken in conjunction with the accompanying drawing, it is believed that a clear understanding of the construction, operation, and advantages of the invention will be quite apparent to those skilled in this art, and that a more detailed description is accordingly deemed unnecessary.

It is to be understood, however, that even though there is herein shown and described a preferred embodiment of the invention, various changes may be made without departing from the spirit and full intendment of the invention.

What is claimed is:

A closure valve device for a keg bushing having a cylindrical tap opening therethrough, a tubular body member fixed at one end portion thereof to said bushing and forming an extension of said tap opening, a valve seat formed on the other end of said tubular body member, a bracket secured to the side of said tubular body member, an arm pivotally supported by said bracket and having an opening extending entirely therethrough, a disc-shaped valve head, a pair of shouldered studs centrally on said valve head and protruding in opposite directions from opposite side faces thereof, the stud on one side of said valve head being extended through the opening in said arm and having a curved surface on the shoulder thereof in contact with a side of the arm, a fastener on said stud outwardly of said arm that permits limited rocking motion of said valve head on said curved surface and relative to said arm, a resilient washer around the larger diameter of the other of said shouldered studs and with one of a pair of flat sides thereof adapted to engage said valve seat and with its other flat side against the adjacent side face of the valve head, said washer being of a thickness substantially equal to the distance between the shoulder on said second-mentioned stud and the side face of the valve head engaged by said washer, a dome-like segment of a sphere having a flat underside and an opening therethrough centrally of said flat underside into which the smaller diameter of said least-mentioned shouldered stud extends and secures the inner portion of said flat underside of said segment against the shoulder of said stud, said flat undersurface of said segment being of a diameter whereby it overlaps said washer inwardly of engagement of said washer with the valve seat, and a spring engaging said arm and said bracket for yieldably maintaining said resilient washer in engagement with said valve seat.

References Cited in the file of this patent

UNITED STATES PATENTS

| | | |
|---|---|---|
| 220,372 | Halladay | Oct. 7, 1879 |
| 676,366 | Koch et al. | June 11, 1901 |
| 1,488,042 | Gonsonland | Mar. 25, 1924 |
| 1,867,988 | Safford et al. | July 19, 1932 |
| 1,885,894 | Campbell | Nov. 1, 1932 |
| 2,021,532 | Wainford | Nov. 19, 1935 |
| 2,235,308 | Banker | Mar. 18, 1941 |
| 2,358,666 | Spayd | Sept. 19, 1944 |

FOREIGN PATENTS

| | | |
|---|---|---|
| 19,500 | Great Britain | of 1896 |
| 682,591 | Great Britain | Nov. 12, 1952 |